US012780159B2

(12) United States Patent

Gan et al.

(10) Patent No.: US 12,780,159 B2
(45) Date of Patent: Nov. 3, 2026

(54) BRAKE-BY-WIRE SYSTEM FOR VEHICLE, VEHICLE, AND CONTROL METHOD

(71) Applicant: Huawei Digital Power Technologies Co., Ltd., Shenzhen (CN)

(72) Inventors: Tian Gan, Shanghai (CN); Chongxi Huang, Shanghai (CN); Hui Ni, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 78 days.

(21) Appl. No.: 18/960,634

(22) Filed: Nov. 26, 2024

(65) Prior Publication Data

US 2025/0171001 A1 May 29, 2025

(30) Foreign Application Priority Data

Nov. 27, 2023 (CN) ......................... 202311610017.4

(51) Int. Cl.

| | |
|---|---|
| ***B60T 8/1761*** | (2006.01) |
| ***B60T 7/04*** | (2006.01) |
| ***B60T 8/172*** | (2006.01) |
| ***B60T 8/88*** | (2006.01) |

(52) U.S. Cl.

CPC ............ *B60T 8/1761* (2013.01); *B60T 7/042* (2013.01); *B60T 8/172* (2013.01); *B60T 8/885* (2013.01); *B60T 2270/416* (2013.01); *B60T 2270/82* (2013.01)

(58) Field of Classification Search

CPC ........ B60T 8/1761; B60T 8/172; B60T 8/885; B60T 8/96; B60T 8/1703; B60T 7/042; B60T 2270/416; B60T 2270/82; B60T 2270/413; B60T 2270/402; B60T 17/18

See application file for complete search history.

(56) References Cited

U.S. PATENT DOCUMENTS 6,126,250 A * 10/2000 Gutoehrlein ............. B60T 8/96 303/170
2002/0163246 A1 11/2002 Schmitt et al.
(Continued)

FOREIGN PATENT DOCUMENTS

CN 102180163 A 9/2011
CN 103661334 A 3/2014
(Continued)

*Primary Examiner* — George C Jin
(74) *Attorney, Agent, or Firm* — Maier & Maier, PLLC

(57) ABSTRACT

This application provides a brake-by-wire system for a vehicle, the vehicle, and a control method for the brake-by-wire system for the vehicle. A brake controller is communicatively connected to a wheel speed sensor of each wheel of the vehicle. The brake controller is configured to output a second control signal in response to invalidity of a wheel speed sensor of one wheel on one axle. The second control signal is used to control two brake units corresponding to the other axle to output brake forces and control two brake units corresponding to the one axle to stop outputting brake forces. Therefore, even if the wheel speed sensor of the wheel on the one axle is invalid, a wheel on the other axle can still be controlled, to prevent the wheel on the other axle from being locked. This can improve traveling safety of the vehicle.

20 Claims, 5 Drawing Sheets

(56) References Cited

U.S. PATENT DOCUMENTS

| | | | | |
|---|---|---|---|---|
| 2004/0075337 | A1* | 4/2004 | Giers | B60T 8/348<br>188/122 |
| 2010/0078519 | A1* | 4/2010 | Cahill | B60T 8/1703<br>244/111 |
| 2010/0117447 | A1* | 5/2010 | Cahill | B60T 8/1703<br>303/126 |
| 2018/0237131 | A1* | 8/2018 | Cahill | B60T 8/1763 |
| 2022/0055588 | A1* | 2/2022 | Kim | B60T 8/92 |
| 2023/0242085 | A1 | 8/2023 | Beuss | |

FOREIGN PATENT DOCUMENTS

| | | | | | |
|---|---|---|---|---|---|
| CN | 106627534 | A | | 5/2017 | |
| CN | 106740772 | A | | 5/2017 | |
| GB | 2603773 | A | * | 8/2022 | B64C 25/34 |

* cited by examiner

BRAKE-BY-WIRE SYSTEM FOR VEHICLE, VEHICLE, AND CONTROL METHOD

CROSS-REFERENCE TO RELATED APPLICATIONS

This application claims priority to Chinese Patent Application No. 202311610017.4, filed on Nov. 27, 2023, which is hereby incorporated by reference in its entirety.

TECHNICAL FIELD

This application relates to the vehicle field, and more specifically, to a brake-by-wire system for a vehicle, the vehicle, and a control method for the brake-by-wire system for the vehicle.

BACKGROUND

When a vehicle takes emergency braking in case of emergency, a wheel is prone to be locked. In this case, the vehicle is likely to lose a steering capability or swerve.

There is a known braking system, four wheels are separately provided with a wheel speed sensor, and a slip ratio of a wheel is controlled based on a wheel speed detected by the wheel speed sensor, so that the wheel can be prevented from being locked. This improves a safety factor of emergency braking of the vehicle during traveling.

However, in the conventional technology, once a wheel speed sensor is faulty, the vehicle loses braking stability, and consequently, the vehicle is easily out of control.

SUMMARY

This application provides a brake-by-wire system for a vehicle, the vehicle, and a control method, so that stable braking control can be continued when a wheel speed sensor is faulty. This prevents a wheel from being locked and improves s traveling safety of the vehicle.

According to a first aspect, a brake-by-wire system for a vehicle is provided, where the vehicle includes two axles, the two axles are separately configured to connect two front wheels and two rear wheels of the vehicle, the brake-by-wire system includes a brake controller and four brake units, and the four brake units are separately configured to output brake forces to the four wheels of the vehicle.

The brake controller is configured to output a first control signal in response to a brake signal and wheel speed signals of wheel speed sensors of the four wheels of the vehicle, where the first control signal is used to control the four brake units to output brake forces, and the wheel speed signal indicates a rotational speed of the wheel.

In addition, the brake controller is configured to output a second control signal in response to invalidity of a wheel speed sensor of one wheel on one axle in a process of receiving the brake signal, where the second control signal is used to control two brake units corresponding to the other axle to output brake forces, and control two brake units corresponding to the one axle to stop outputting brake forces.

That is, the brake controller is configured to: in response to invalidity of a wheel speed sensor of one wheel on a first axle (namely, any one of a front axle or a rear axle), receive a wheel speed signal sent by a wheel speed sensor of the other wheel on the first axle, where the wheel speed signal indicates a wheel speed detected by the wheel speed sensor of the other wheel on the first axle. In addition, the brake controller is further configured to generate a brake signal based on the wheel speed signal, where the brake signal is used to control a magnitude of a brake force output by a brake unit to a second axle (namely, an axle other than the first axle in the front axle or the rear axle). In addition, the magnitude of the brake force is determined based on a vehicle speed indicated by the wheel speed signal.

It should be noted that in embodiments of this application, a control signal (including the first control signal and the second control signal) may specifically control a brake force, brake torque, clamping force, or the like output by a brake unit, to further control a brake force for each wheel.

In the following, for ease of understanding and description, the wheel whose wheel speed sensor is invalid is referred to as a first wheel. The other wheel on the axle (namely, the first axle) on which the wheel whose wheel speed sensor is invalid is located is referred to as a second wheel.

When wheel speed sensors of all wheels are valid, a brake force that is for a third wheel (namely, any wheel on the second axle) and that is indicated by the first control signal is determined in the following manner: first, calculating a slip ratio of the third wheel based on a vehicle speed calculated by a vehicle speed calculation module and a wheel speed of the third wheel; and then based on the slip ratio of the third wheel, determining the brake force that is for the third wheel and that is indicated by the first control signal. In other words, when the wheel speed sensors of all the wheels are valid, a calculated slip ratio of each wheel is independent of wheel speeds of other wheels.

When the wheel speed sensor of the first wheel is invalid, a brake force that is output by a brake unit of a third wheel and that is indicated by the second control signal is determined in the following manner: first, determining a vehicle speed of the vehicle based on a wheel speed of the second wheel; then, determining a slip ratio of the third wheel based on the vehicle speed and a wheel speed of the third wheel; and determining the brake force indicated by the second control signal Abased on the slip ratio. In other words, when a wheel speed sensor of a wheel on one axle is invalid, brake forces for wheels on the other axle are related to a wheel speed of the vehicle and a wheel speed of the other wheel on the one axle. To be specific, the brake controller is configured to output the second control signal based on a wheel speed indicated by a wheel speed sensor of the other wheel on the one axle, where the second control signal indicates a slip ratio of and the brake force for a wheel corresponding to the other axle. In addition, the slip ratio that is of the wheel corresponding to the other axle and that is indicated by the second control signal changes with the wheel speed indicated by the wheel speed sensor of the other wheel on the one axle.

According to the solutions provided in embodiments of this application, a wheel speed signal is obtained from a wheel speed sensor that is not invalid on the first axle, and then a vehicle speed can be determined based on the wheel speed signal, so that a slip ratio of a wheel on the second axle can be calculated based on the vehicle speed and a wheel speed that is detected by a wheel speed sensor on the second axle, and then a brake force to be applied to the wheel on the second axle can be controlled based on the slip ratio. This can prevent the wheel on the second axle from being locked, and can improve the traveling safety of the vehicle.

To enable the wheel speed signal of the wheel speed sensor that is not invalid on the first axle to reliably reflect the vehicle speed, the wheels on the first axle may be enabled to be in a non-braking state.

For example, in a possible implementation, the brake controller is further configured to send a control signal to the brake unit, where the control signal indicates to stop outputting brake forces to the wheels on the one axle. In addition, in this case, the wheel speed signal is received by the brake controller after the brake forces for the wheels on the one axle are changed to be 0.

In other words, if the brake unit of the first wheel and the brake unit of the second wheel are in a state in which a brake force is being output, the brake controller sends a control signal, where the control signal indicates the brake unit to stop outputting the brake force.

In another possible implementation, the second control signal further indicates that the brake force output to a wheel on the one axle is 0.

To be specific, in embodiments of this application, a brake force for a wheel on the first axle is kept at 0 when a brake force is output to a wheel on the second axle.

In the foregoing two implementations, the first axle can be in a non-braking state, so that the vehicle speed determined based on the wheel speed signal of the wheel speed sensor of the second wheel can be close to a real vehicle speed. This can further ensure accuracy of a slip ratio of a wheel on the second axle, and can more reliably prevent a wheel on the second axle from being locked.

In a possible implementation, the brake controller is further configured to: stop sending the control signal to the brake unit in response to invalidity of a wheel speed sensor of at least one wheel other than the wheel whose wheel speed sensor is invalid.

For example, when the wheel speed sensor of the second wheel on the first axle is faulty, the vehicle speed cannot be determined based on the wheel speed signal of the wheel speed sensor of the second wheel, and therefore a slip ratio of a wheel on the second axle cannot be calculated. In this case, the control signal is stopped from being output to a brake unit of the wheel on the second axle. This can avoid an accident because a brake force indicated by the control signal is inaccurate.

In another possible implementation, the brake controller is further configured to output a third control signal in response to invalidity of wheel speed sensors of at least two wheels in the process of receiving the brake signal, where the third control signal is used to control the four brake units to output brake forces, and slip ratios that are of the four wheels and that are indicated by the third control signal do not change with wheel speeds indicated by the wheel speed sensors of the four wheels.

To be specific, when two or more wheel speed sensors of the vehicle are faulty, a brake unit of each wheel is controlled to output a preset brake force, so that a possibility of occurrence of a locking case can be reduced. For example, the preset brake force may be less than a brake force indicated by a brake signal of a brake pedal. In addition, the preset brake force may be determined based on experiments, historical experience, or the like.

In embodiments of this application, the brake controller is communicatively connected to the vehicle speed calculation module of the vehicle. The vehicle speed calculation module is configured to calculate a vehicle speed of the vehicle. For example, the vehicle speed calculation module may receive a signal from a sensor like an acceleration sensor or an angular velocity sensor, and calculate a speed of the vehicle based on the received signal (for example, an acceleration signal or an angular velocity signal).

In this case, the brake controller is further configured to output a fourth control signal in response to the brake signal and the wheel speed signals of the wheel speed sensors of the four wheels of the vehicle when the wheel speed sensor of the one wheel on the one axle is restored to be valid. A process of determining the fourth control signal is similar to a process of determining the first control signal.

Specifically, when the wheel speed sensor of the first wheel is restored to be valid, a brake force for a wheel on the first axle may be controlled again. In this case, the wheel speed signal of the wheel speed sensor of the second wheel on the first axle cannot accurately reflect the vehicle speed. In this case, the vehicle speed signal of the vehicle speed calculation module on the vehicle can more accurately reflect the vehicle speed. Therefore, a brake force indicated by a control signal that is updated based on the vehicle speed signal can more reliably avoid wheel lock.

In a possible implementation, the updated control signal is used to control a brake force output by a brake unit of a wheel on the other axle to first change from a first value to at least one second value and then to a third value, where the first value is a value of a brake force determined based on the wheel speed signal, the third value is a value of a brake force determined based on a vehicle speed signal, and the at least one second value is between the first value and the third value.

The "first change from a first value to at least one second value first" may be understood as changing from the first value to each second value in sequence of all second values. When the first value is greater than the third value, the at least one second value is arranged in descending order. When the first value is less than the third value, the at least one second value is arranged in ascending order.

Specifically, because magnitudes of brake forces separately determined based on the wheel speed signal and the vehicle speed signal may be different, or even greatly different, if the brake force output by the brake unit directly changes greatly, an acceleration or a deceleration may be excessively large. As a result, driving experience is affected. A staged transition change of the brake force controlled by using the updated control signal can avoid an excessively large acceleration or deceleration, thereby improving the driving experience.

In another implementation, the updated control signal is used to control a brake force output by a brake unit of a wheel on the one axle to first change from 0 to at least one fourth value and then to a fifth value, where the fifth value is a value of the brake force determined based on the vehicle speed signal, and the at least one fourth value is between 0 and the fifth value.

Specifically, because a wheel on the first axle is in the non-braking state, when the invalid wheel speed sensor is restored and the wheel on the first axle needs to be braked, if the determined brake force is relatively large, a deceleration may be excessively large. As a result, an accident occurs. A staged transition change of the brake force controlled by using the updated control signal can avoid an excessively large deceleration, thereby reducing accidents and improving the driving experience.

According to a second aspect, a vehicle is provided. The vehicle includes wheels, a brake pedal, a vehicle control unit, and a braking system. The brake pedal and the vehicle control unit are configured to send a brake signal to a brake controller in the braking system. The brake controller is configured to respond to the brake signal, and generate a control signal based on a wheel speed signal, where the control signal is used to control the brake unit to output a brake force to a wheel. A structure of the braking system and functions of components in the braking system are similar to those described in the first aspect. To avoid repetition, detailed descriptions thereof are omitted herein.

According to a third aspect, a control method for a brake-by-wire system for a vehicle is provided. The vehicle includes two axles, the two axles are separately configured to connect two front wheels and two rear wheels of the vehicle, the brake-by-wire system includes a brake controller and four brake units, the four brake units are separately configured to output brake forces to the four wheels of the vehicle, and in a braking process of the vehicle, the method includes: outputting a first control signal in response to a brake signal and wheel speed signals of wheel speed sensors of the four wheels of the vehicle, where the first control signal is used to control the four brake units to output brake forces, and the wheel speed signal indicates a rotational speed of a wheel; and outputting a second control signal in response to invalidity of a wheel speed sensor of one wheel on one axle in a process of receiving the brake signal, where the second control signal is used to control two brake units corresponding to the other axle to output brake forces, and control two brake units corresponding to the one axle to stop outputting brake forces. Specific steps of the method are similar to the steps performed by the brake according to the first aspect and any possible implementation of the first aspect. To avoid repetition, detailed descriptions thereof are omitted herein.

DESCRIPTION OF EMBODIMENTS

The following describes technical solutions of this application with reference to accompanying drawings.

Figure 1:
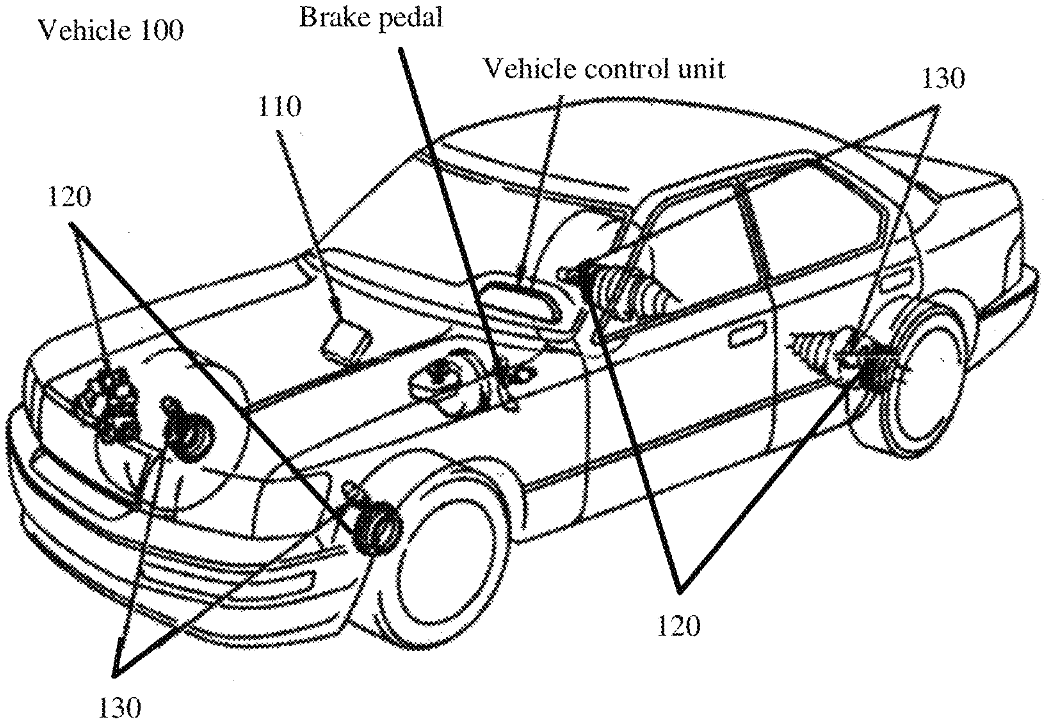
FIG. 1 is a diagram of a vehicle according to an embodiment of this application.

FIG. 1 is a diagram of a vehicle according to this application. As shown in FIG. 1, a vehicle 100 provided in an embodiment of this application has two axles at the front and rear, and each axle includes two wheels at the left and right sides.

Each vehicle 100 includes a braking system. The braking system may be a brake-by-wire system. The brake-by-wire system may also be referred to as an electronic control braking system, and is classified into a mechanical brake-by-wire system and a hydraulic brake-by-wire system.

The mechanical brake-by-wire system (electronic mechanical brake system, EMB) uses electric energy as an energy source, drives a brake pad via a motor, transmits energy through a wire, and transmits a signal through a data line.

The hydraulic brake-by-wire system (electronic hydraulic brake system, EHB) uses an advanced mechatronics manner in which a part of conventional mechanical components are replaced with electronic components, and combines an electronic system with a hydraulic system.

The braking system provided in this embodiment of this application may include a brake pedal and a brake, for example, a brake pad and a brake disc.

When a driver needs to brake the vehicle, the driver operates the brake pedal, and the brake pedal generates a brake signal, where the brake signal is used to control the brake to perform braking.

In addition, the vehicle 100 may further include a vehicle control unit (vehicle control unit, VCU). The VCU is configured to: collect a motor control system signal, an acceleration pedal signal, a brake pedal signal, and another component signal; and after performing comprehensive analysis and response determining based on a driving intention of the driver, monitor an action of each component controller at a lower layer, to implement functions such as control of normal traveling of the vehicle, braking feedback of battery energy, network management, fault diagnosis and processing, and vehicle status monitoring.

When determining that the vehicle needs to be braked, the VCU can generate the foregoing brake signal.

In this embodiment of this application, the braking system has an anti-lock function. To be specific, when it is detected that a slip ratio or another lock representation signal exceeds a threshold, the braking system may adjust a control signal distributed to each wheel, to prevent each wheel from being locked.

"Lock" means that when there is no relative sliding friction between the brake pad and the brake disc, kinetic energy of the vehicle is converted into heat energy, and finally the vehicle stops or decelerates. For example, when the vehicle is in emergency braking, the wheel is in a completely stationary state. However, under the action of inertia, the vehicle continues to slide forward for a distance, and finally the vehicle can stop completely. If a front wheel and a rear wheel of the vehicle are not on a same straight line, the front wheel and the rear wheel slide toward their respective fronts due to the inertia. Based on a test of tire limit braking, a tire cannot provide a lateral grip when straight linear braking is saturated, and in this case, it is difficult for the vehicle to complete any lateral control, so that the vehicle may yaw (spin) uncontrollably when the front wheel and the rear wheel run in two different directions, and the vehicle swerves. In this case, a steering wheel of the vehicle is uncontrollable, and then the vehicle is completely out of control. If the situation is very serious, the vehicle is highly likely to overturn, causing traffic accidents and other hazards.

"Anti-lock" means to prevent the vehicle from braking for one time, and to use intermittent braking, the vehicle automatically adjusts a brake torque (wheel brake force) that acts on the wheel, to prevent the wheel from being locked when the brake torque is large.

In this embodiment of this application, the braking system determines the slip ratio of the wheel in real time, and keeps the slip ratio of the wheel near an optimal value during braking. Therefore, when anti-lock control of the braking system works, the driver does not lose control of vehicle steering due to front wheel locking. This can reduce an impact force when an accident occurs.

Figure 2:
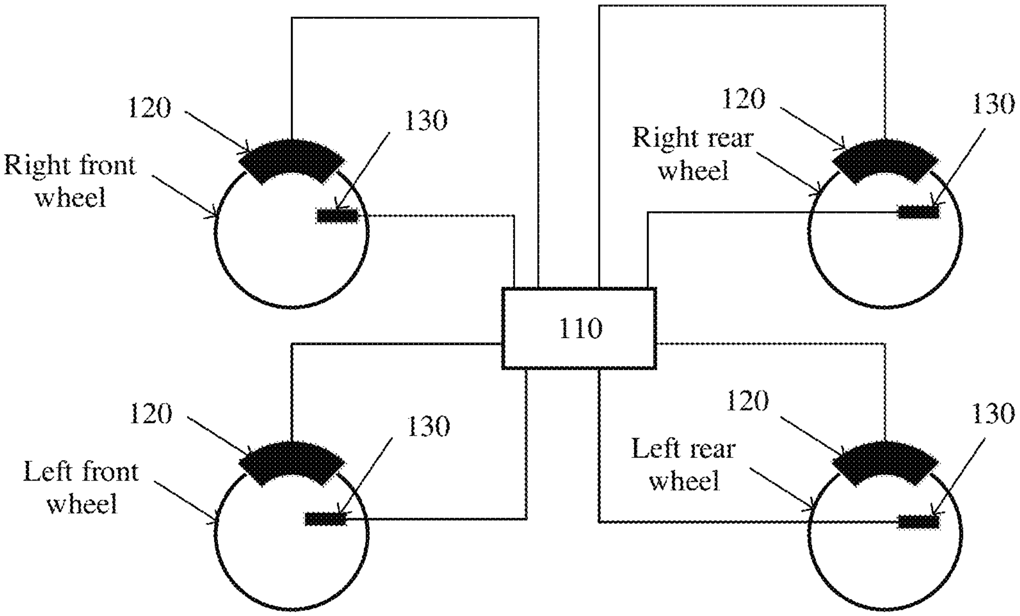
FIG. 2 is a diagram of an example of a structure of a braking system according to an embodiment of this application.
Figure 3:
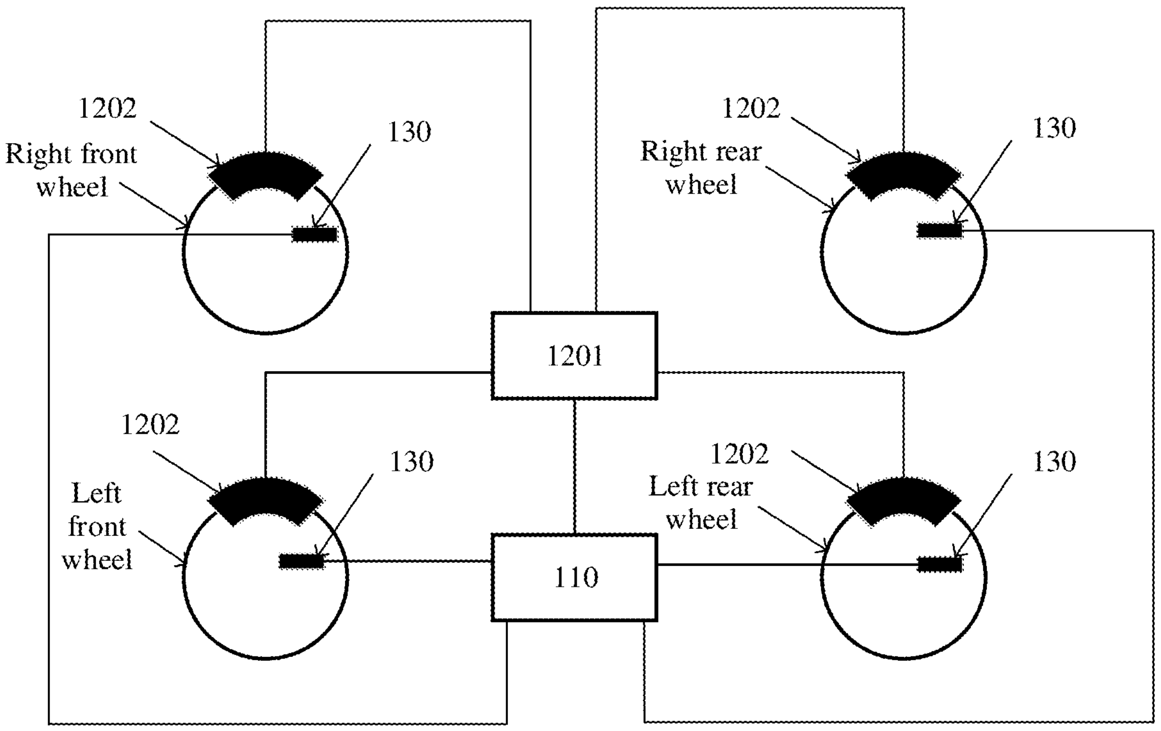
FIG. 3 is a diagram of another example of a structure of a braking system according to an embodiment of this application.

As shown in FIG. 1 to FIG. 3, the braking system in embodiments of this application includes a brake controller 110, brake units 120, and wheel speed sensors 130.

The wheel speed sensor 130 may also be referred to as a rotational speed sensor. One wheel speed sensor 130 is configured for each wheel of the vehicle. The wheel speed sensor 130 of each wheel is configured to detect a rotational speed of the wheel, and generate a wheel speed signal indicating the rotational speed.

In an implementation, the wheel speed sensor 130 may be installed on the wheel. In another implementation, the wheel speed sensor 130 may alternatively be installed in a drive system component like a main reducer or a transmission gearbox.

The wheel speed sensor 130 is formed by pairing a sensor and a ring gear. The sensor is installed on a fastening apparatus on an inner side of the wheel, and the ring gear is installed on a wheel rim. The sensor includes a large quantity of electromagnetic coils that can generate magnetic lines. Therefore, when the wheel rotates, the ring gear on the wheel rim is driven to rotate. In this case, the generated magnetic lines are cut by the ring gear, so that the electromagnetic coils in the sensor generate an alternating current through induction, and then a movement speed of the wheel may be determined based on a related parameter of the alternating current.

The brake controller 110 may also be referred to as an electronic control unit (electronic control unit, EUC). The brake controller 110 may be implemented by using a computing device like a processor or a logic circuit.

The brake controller 110 is communicatively connected to the wheel speed sensor 130 through a signal transmission line like a bus. In addition, the brake controller 110 is communicatively connected to the brake unit 120 through a signal transmission line like a bus.

In addition, the brake controller 110 is further communicatively connected to the brake pedal or the vehicle control unit of the vehicle through a signal transmission line like a bus. The brake controller 110 may detect a brake signal from the brake pedal or the vehicle control unit, and in response to the brake signal, perform the following control.

To be specific, the brake controller 110 receives the wheel speed signal input by the wheel speed sensor 130, performs calculation and logic analysis based on a preset control logic and the wheel speed signal, determines whether the wheel has a lock trend, and further generates a control signal, where the control signal is used to control a brake force output by the brake unit 120. Then, the brake controller 110 sends the control signal to the brake unit 120 to adjust the brake force.

The brake unit 120 is configured to respond to the control signal, and output, to each wheel, the brake force indicated by the control signal.

For example, the brake unit 120 includes a brake 1202 and an adjuster 1201. To be specific, each wheel is provided with the brake 1202, and each brake 1202 is configured to output a brake force to a wheel in which the brake 1202 is located. The adjuster 1201 is configured to respond to the control signal, and adjust the brake force output by each brake 1202.

As shown in FIG. 2, in an implementation, the brake unit 120 includes four brakes 1202 and four adjusters 1201. In other words, the vehicle has an independent brake unit 120. In this case, the brake controller 110 may separately send a control signal to each brake unit 120 (or to each adjuster 1201).

As shown in FIG. 3, in another implementation, the brake unit 120 includes four brakes 1202 and one adjuster 1201. In other words, each wheel is provided with the brake 1202, and the four wheels share the one adjuster 1201. The adjuster 1201 is configured to respond to the control signal, and adjust the brake force output by each brake 1202.

In an implementation, the adjuster 1201 may include a solenoid valve, a hydraulic pump, a motor, and the like, so that the brake force output by each brake 1202 can be controlled by controlling hydraulic pressure of each brake 1202.

The brake 1202 may be the brake of the braking system of the vehicle 100, for example, the brake pad or the brake disc.

Figure 4:
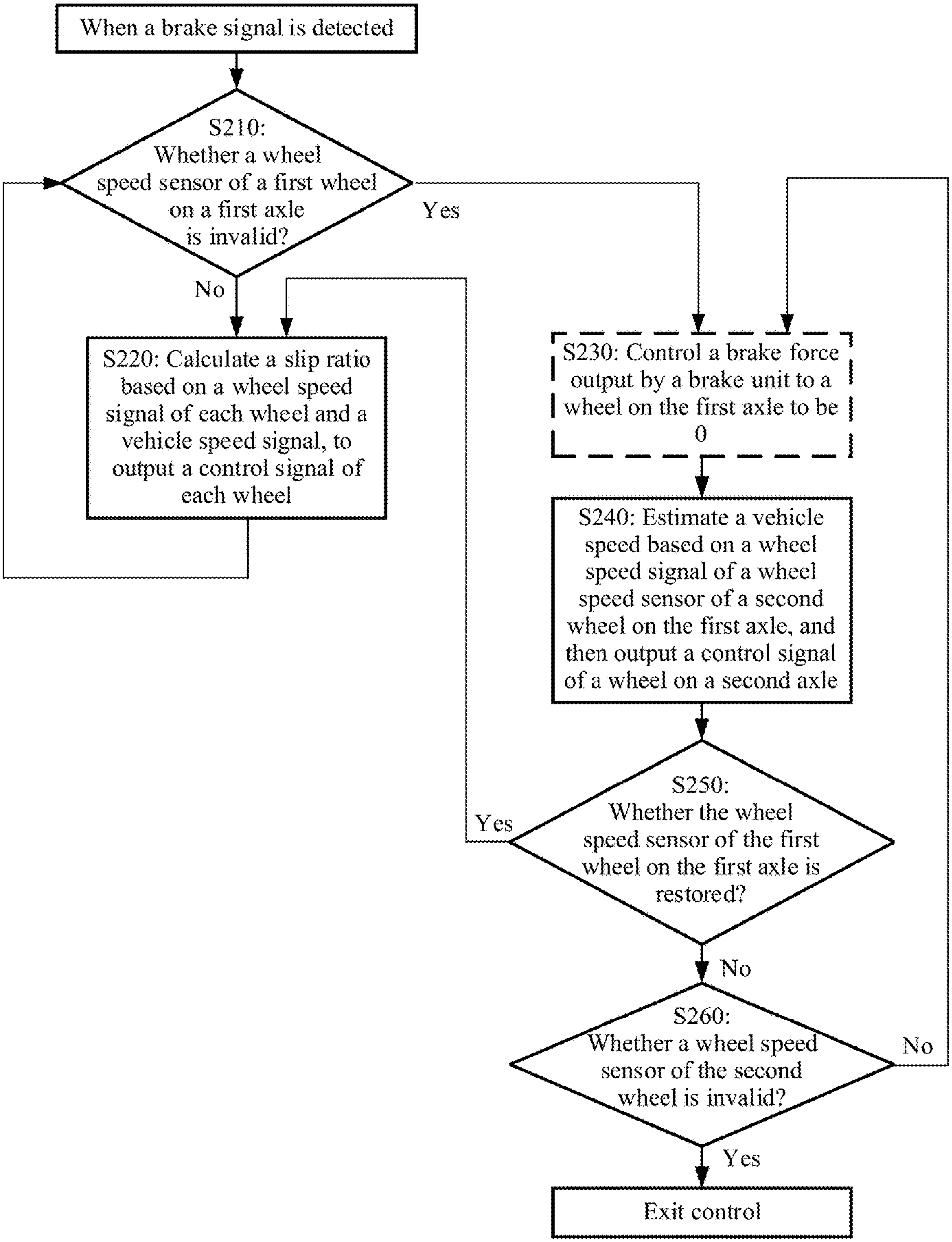
FIG. 4 is a flowchart of a control process of a braking system according to an embodiment of this application.

FIG. 4 is a diagram of a specific control process of the brake controller 110. As shown in FIG. 4, when the brake controller 110 detects a brake signal from the brake pedal, the vehicle control unit, or the like, or when the brake controller 110 detects that the brake of the vehicle outputs a brake force, the brake controller 110 performs the following control.

S210: The brake controller 110 detects whether the wheel speed sensor of each wheel is valid.

For example, the braking system further includes a detection module. The detection module is configured to detect whether the wheel speed sensor of each wheel is valid.

For example, the wheel speed sensor of each wheel may periodically send a pulse signal to the detection module, so that the detection module may determine, based on the pulse signal, whether each wheel speed sensor is valid.

For another example, the detection module may determine, based on a deviation between a wheel speed detected by each wheel speed sensor and a reference value, whether each wheel speed sensor is invalid. For example, if a deviation between a wheel speed detected by a specific wheel speed sensor and the reference value is greater than a preset threshold, it is determined that the specific wheel speed sensor is invalid. In an implementation, an average value of wheel speeds detected by the wheel speed sensors may be used as the reference value. In another implementation, the reference value may be determined based on a vehicle speed calculated by a vehicle speed calculation module.

In addition, when the brake controller 110 determines that each wheel speed sensor is valid, S220 is performed.

When the brake controller 110 determines that a wheel speed sensor of one wheel is invalid, S240 is performed.

The following first describes a control process of the brake controller 110 when each wheel speed sensor is valid.

S220: The brake controller 110 determines, based on a wheel speed signal from each wheel speed sensor and a vehicle speed signal from the vehicle speed calculation module, a brake force to be applied to each wheel. Because methods for determining brake forces to be applied to all wheels are similar, for ease of understanding, a process of determining a brake force to be applied to wheel a is used as an example for description.

The vehicle speed calculation module may calculate the vehicle speed based on, for example, a positive acceleration, a negative acceleration, or a yaw angular velocity of the vehicle. The foregoing parameters may be detected via an acceleration sensor or the like in the vehicle.

The brake controller 110 determines a rotational speed of wheel a based on a wheel speed signal from a wheel speed sensor of wheel a, and may convert the rotational speed of wheel a into a speed of wheel a based on a radius of wheel a.

In addition, the brake controller 110 determines the speed of the vehicle based on the vehicle speed signal from the vehicle speed calculation module.

Further, the brake controller 110 determines a slip ratio of wheel a based on the speed of wheel a and the speed of the vehicle.

For example, the brake controller 110 obtains an initial brake force obtained through calculation based on the brake signal. Then, the brake controller 110 determines a relationship between the slip ratio and the preset threshold. If the slip ratio is less than the threshold, the brake controller determines that the brake force to be applied to wheel a is the initial brake force. If the slip ratio is greater than the threshold, the brake controller adjusts the initial brake force based on the slip ratio, to obtain a brake force to be finally applied to wheel a. Specifically, when the slip ratio is greater than the threshold, because there is an association relationship between the slip ratio of the wheel and the brake force to be applied to the wheel, the brake controller 110 may calculate, based on the association relationship and for a purpose of enabling the slip ratio of wheel a to be within a preset slip ratio range, the brake force to be applied to wheel a. The association relationship and the slip ratio range may be determined based on experiments or historical experience. In other words, when the slip ratio of wheel a is within the preset slip ratio range, wheel a is not locked.

Then, the brake controller 110 sends a control signal to the brake unit 120 (for example, the brake unit 120 of wheel a), where the control signal indicates the calculated brake force to be applied to wheel a. In embodiments of this application, the brake unit may apply a brake force to each wheel by using an output brake force, brake torque, clamping force, or the like. Therefore, the control signal may be used to specifically control the brake force, brake torque, clamping force, or the like that is output by the brake unit.

Figure 5:
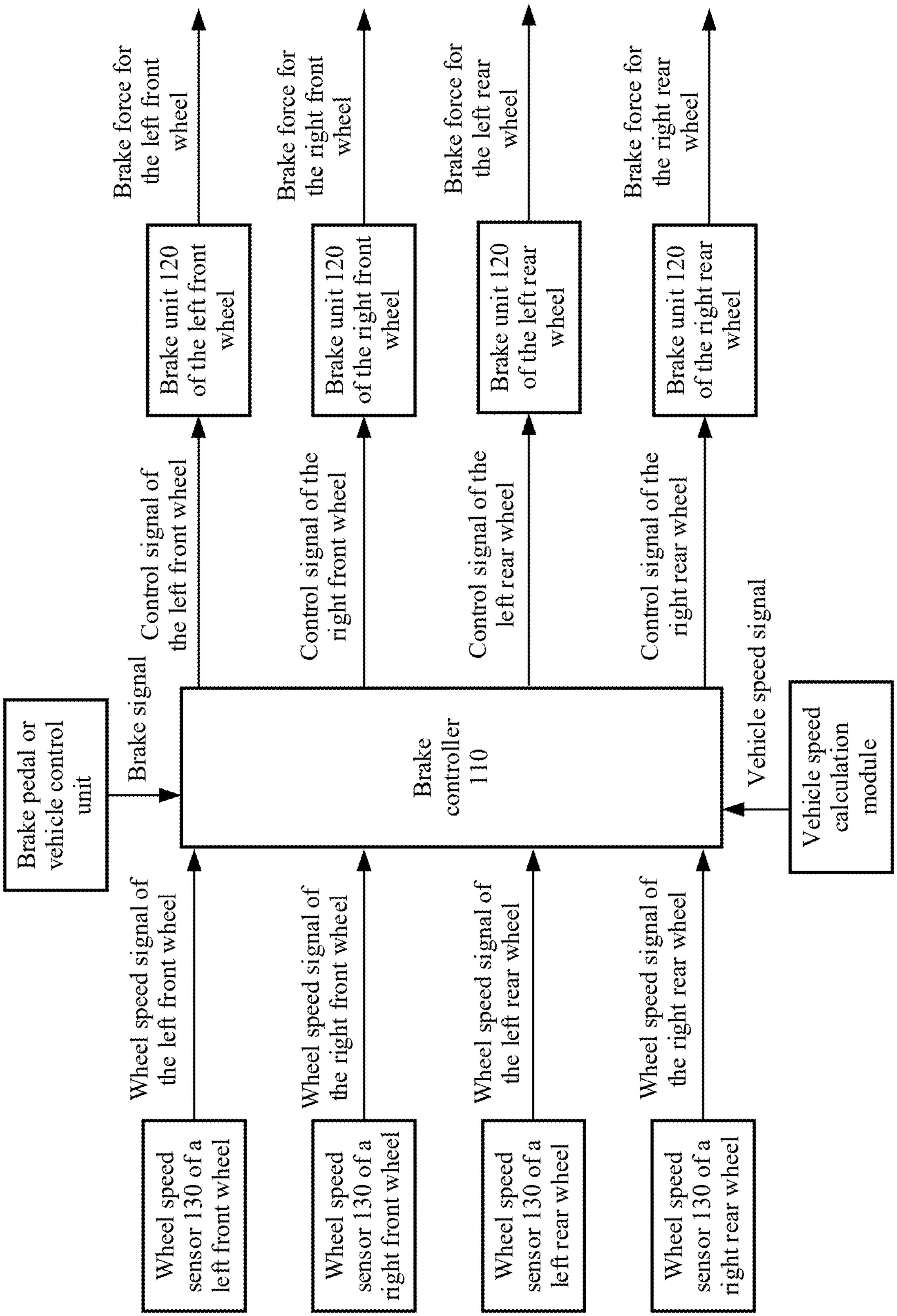
FIG. 5 is a diagram of distribution of a brake force to each wheel when each wheel speed sensor is valid.

To be specific, as shown in FIG. 5, when each wheel speed sensor is valid, the braking system separately controls the brake force to be applied to each wheel based on the foregoing process.

The following describes a control process of the brake controller 110 when a wheel speed sensor is invalid.

For ease of understanding and description, a wheel on which the invalid wheel speed sensor is located is denoted as a first wheel. An axle on which the first wheel is located is denoted as a first axle. The other wheel on the first axle is denoted as a second wheel. The other axle other than the first axle is denoted as a second axle.

S240: The brake controller 110 determines, based on a wheel speed signal from a wheel speed sensor of the second wheel and a wheel speed signal from each wheel speed sensor of the second axle, a brake force to be applied to each wheel on the second axle. Because methods for determining the brake forces to be applied to the wheels on the second axle are similar, for ease of understanding, a process of determining a brake force to be applied to wheel b is used as an example for description.

The brake controller 110 determines a rotational speed of the second wheel based on the wheel speed signal from the wheel speed sensor of the second wheel, and may convert the rotational speed of the second wheel into a vehicle speed based on a radius of the second wheel.

In a possible implementation, the brake controller 110 may determine the vehicle speed based on both a vehicle speed signal from the vehicle speed calculation module and the wheel speed signal from the wheel speed sensor of the second wheel. For example, it is assumed that a vehicle speed indicated by the vehicle speed signal is V1, and a vehicle speed calculated based on the wheel speed signal from the wheel speed sensor of the second wheel is V2, and in this case, the vehicle speed may be calculated based on V1 and V2 in a manner of weighted averaging or the like.

In addition, the brake controller 110 determines a rotational speed of wheel b based on a wheel speed signal from a wheel speed sensor of wheel b, and may convert the rotational speed of wheel b into a speed of wheel b based on a radius of wheel b.

Further, the brake controller 110 determines a slip ratio of wheel b based on the speed of the vehicle and the speed of wheel b.

Because there is an association relationship between the slip ratio of the wheel and the brake force to be applied to the wheel, the brake controller 110 may calculate, based on the association relationship and for a purpose of enabling the slip ratio of wheel b to be within a preset slip ratio range, the brake force to be applied to wheel b.

The association relationship and the slip ratio range may be determined based on experiments or historical experience. In other words, when the slip ratio of wheel b is within the preset slip ratio range, wheel b is not locked.

Then, the brake controller 110 sends a control signal to the brake unit 120 (for example, the brake unit 120 of wheel b), where the control signal indicates the calculated brake force to be applied to wheel b.

Because the wheel speed sensor of the first wheel is invalid, a brake force that prevents the first wheel from being locked cannot be determined. Therefore, in a possible implementation, the brake controller 110 does not send the control signal to the brake unit 120 (for example, the brake unit 120 of the first wheel).

In addition, if brake forces applied to the first wheel and the second wheel on the first axle are different, rotational speeds of the first wheel and the second wheel may be different. Consequently, a traveling direction of the vehicle changes, and an accident occurs. Therefore, in embodiments of this application, the brake controller 110 does not send the control signal to the brake unit 120 (for example, the brake unit 120 of the second wheel).

Figure 6:
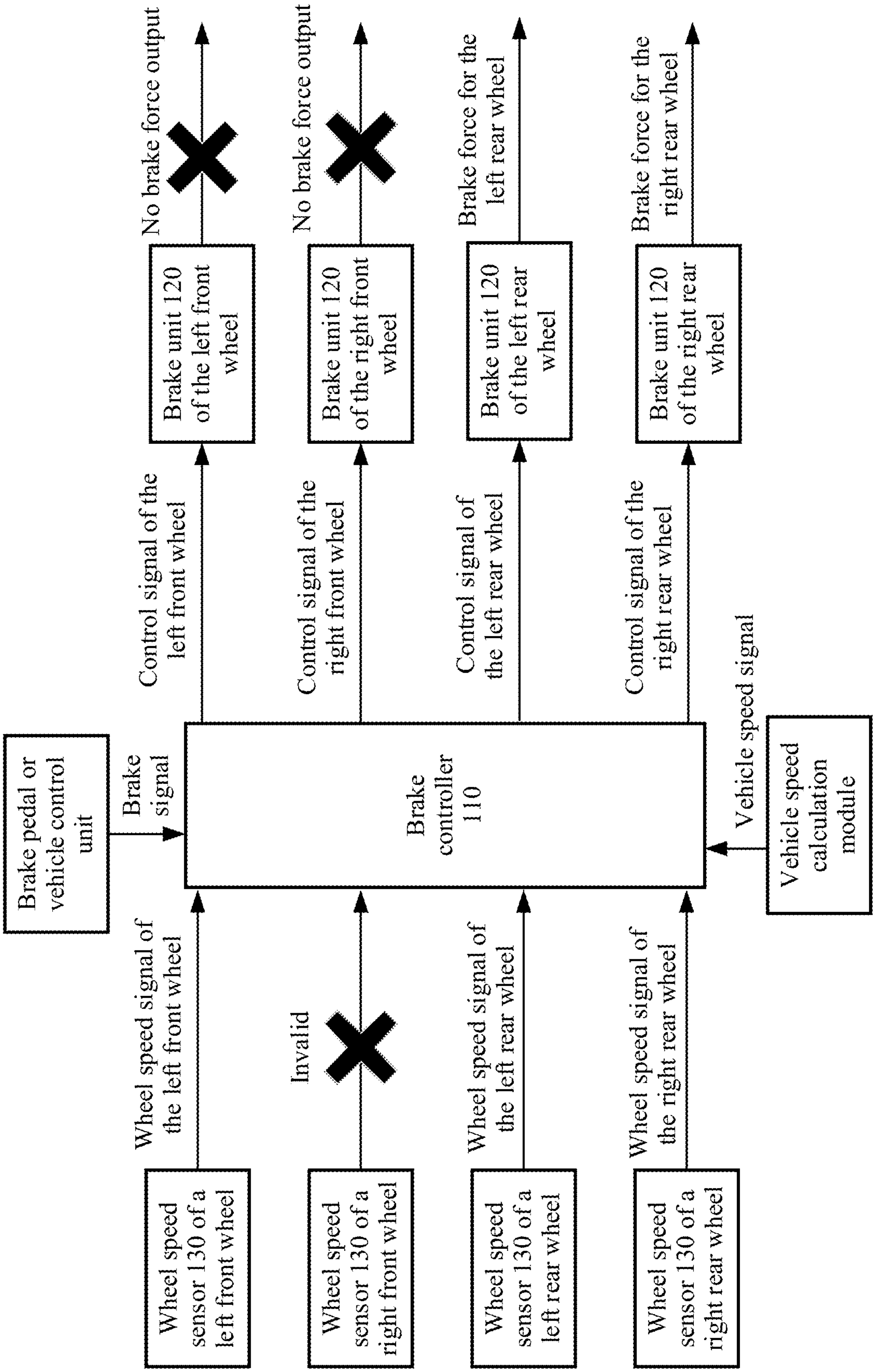
FIG. 6 is a diagram of distribution of a brake force to each wheel when a wheel speed sensor of a right front wheel is invalid.

To be specific, as shown in FIG. 6, when one wheel speed sensor (for example, the first wheel is a right front wheel) is invalid, the braking system separately controls a brake force applied to each wheel based on the foregoing process.

As described above, the wheel speed signal of the wheel speed sensor of the second wheel is used to calculate the vehicle speed. Therefore, to enable the rotational speed of the second wheel to reliably reflect the vehicle speed, the second wheel needs to be in a non-braking state. Therefore, in a possible implementation, before the brake controller 110 performs S240, S230 may be performed. S230: The brake controller 110 performs control, to enable brake forces applied to the first wheel and the second wheel to be 0.

For example, if the brake unit 120 is outputting brake forces to the first wheel and the second wheel, the brake controller 110 may send control signals to the brake units 120, where the control signals indicate to stop outputting the brake forces to the first wheel and the second wheel.

For another example, if the brake unit 120 does not output brake forces to the first wheel and the second wheel, the brake controller 110 may send control signals to the brake units 120, where the control signals indicate to prohibit outputting the brake forces to the first wheel and the second wheel.

In an actual working process, there may be a case in which an invalid wheel speed sensor is restored to be valid. In this case, the brake unit 120 may perform the following steps.

S250: The brake controller 110 detects whether the wheel speed sensor of the first wheel is restored to be valid.

If the wheel speed sensor of the second wheel is restored to be valid, the brake controller 110 may perform the foregoing processing process of S220, to control the brake force to be applied to each wheel.

If the brake controller 110 still does not receive a pulse signal of the wheel speed sensor of the second wheel, the brake controller 110 may determine that the wheel speed sensor of the second wheel is still invalid. In this case, the brake controller 110 returns to perform S230.

It should be noted that a value (denoted as a first value) that is of a brake force to be applied to a wheel (denoted as wheel c) on the second axle and that is calculated based on the solution provided in S240 may be different from or even greatly different from a value (denoted as a third value) that is of a brake force to be applied to wheel c and that is calculated based on S220. Therefore, if the brake force is directly switched from the first value to the third value, a relatively large acceleration or deceleration may occur. As a result, traveling safety is affected.

For this, the brake controller 110 may determine a plurality of intermediate values (namely, second values) between the first value and the third value, so that the brake controller may enable the brake force for wheel c to transit from the first value to the third value in sequence through the plurality of second values in a step change manner.

Similarly, based on the solution provided in S240, a brake force to be applied to the first wheel is 0, and a value (denoted as a fifth value) that is of a brake force to be applied to the first wheel and that is calculated based on S220 is not 0. Therefore, if the brake force is directly switched from 0 to the fifth value, a relatively large deceleration may occur. As a result, traveling safety is affected.

For this, the brake controller 110 may determine a plurality of intermediate values (namely, fourth values) between 0 and the fifth value, so that the brake controller may enable the brake force for the first wheel to transit from 0 to the fifth value in sequence through the plurality of fourth values in a step change manner.

Control on the second wheel is similar to that on the first wheel. To avoid repetition, detailed descriptions thereof are omitted herein.

In an actual working process, there may be a case in which a wheel speed sensor of a wheel other than the first wheel is invalid. In this case, the brake unit 120 may perform the following steps.

S260: The brake controller 110 detects whether the wheel other than the first wheel is invalid. This process is similar to S210. To avoid repetition, detailed descriptions thereof are omitted herein.

If both the wheel speed sensors of the first wheel and at least one wheel other than the first wheel are invalid, the brake controller 110 may exit the control in S240 and S250. In this case, the brake force may be controlled by the brake signal.

If a state in which only the wheel speed sensor of the first wheel is invalid is still maintained, the brake controller may return to perform S230 or S240.

According to the solutions provided in embodiments of this application, a wheel speed signal is obtained from a wheel speed sensor that is not invalid on the first axle, and then a vehicle speed can be determined based on the wheel speed signal, so that a slip ratio of a wheel on the second axle can be calculated based on the vehicle speed and a wheel speed that is detected by a wheel speed sensor on the second axle, and then a brake force to be applied to the wheel on the second axle can be controlled based on the slip ratio. This can prevent the wheel on the second axle from being locked, and can improve the traveling safety of the vehicle.

A person of ordinary skill in the art may be aware that units and algorithm steps in the examples described with reference to embodiments disclosed in this specification can be implemented by electronic hardware or a combination of computer software and electronic hardware. Whether functions are performed in a hardware or software manner depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes various media that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A brake-by-wire system for a vehicle, wherein the vehicle comprises a first axle and a second axle, the first axle and the second axle are separately configured to connect two front wheels and two rear wheels of the vehicle, the brake-by-wire system comprises a brake controller and four brake units, the four brake units are separately configured to output brake forces to the four wheels of the vehicle, and the brake controller is configured to:

output a first control signal in response to a brake signal and wheel speed signals of wheel speed sensors of the four wheels of the vehicle, wherein the first control signal is used to control the four brake units to output brake forces, and each wheel speed signal indicates a rotational speed of a corresponding wheel; and output a second control signal in response to invalidity of a wheel speed sensor of a first wheel on the first axle in a process of receiving the brake signal, wherein the second control signal is used to control two brake units corresponding to the second axle to output brake forces, and to control two brake units corresponding to the first axle to stop outputting brake forces, wherein outputting the second control signal comprises determining a vehicle speed of the vehicle based on a wheel speed indicated by a wheel speed sensor of a second wheel on the first axle, determining a slip ratio of a wheel corresponding to the second axle based on the vehicle speed and a wheel speed of the wheel corresponding to the second axle, and controlling a brake force for the wheel corresponding to the second axle based on the slip ratio.

2. The brake-by-wire system according to claim 1, wherein the brake controller is further configured to:

output a third control signal in response to invalidity of wheel speed sensors of at least two wheels in the process of receiving the brake signal, wherein the third control signal is used to control the four brake units to output brake forces, and wherein slip ratios of the four wheels indicated by the third control signal do not change with wheel speeds indicated by the wheel speed sensors of the four wheels.

3. The brake-by-wire system according to claim 1, wherein the brake controller is further configured to:

output a fourth control signal in response to the brake signal and the wheel speed signals of the wheel speed sensors of the four wheels of the vehicle when the wheel speed sensor of the first wheel on the first axle is restored to be valid.

4. The brake-by-wire system according to claim 3, wherein the fourth control signal indicates that a brake force output by a brake unit of a wheel on the second axle first changes from a first value to at least one second value and then to a third value, wherein the first value is a value of a brake force indicated based on the first control signal, the third value is a value of a brake force determined based on a vehicle speed signal, and the at least one second value is between the first value and the third value.

5. The brake-by-wire system according to claim 3, wherein the fourth control signal indicates that a brake force output by a brake unit of a wheel on the first axle first changes from 0 to at least one fourth value, and then to a fifth value, wherein the fifth value is a value of the brake force determined based on a vehicle speed signal, and the at least one fourth value is between 0 and the fifth value.

6. The brake-by-wire system according to claim 1, wherein the brake controller is configured to receive the wheel speed indicated by the wheel speed sensor of the second wheel after brake forces for the first wheel and the second wheel on the first axle have been changed to 0.

7. The brake-by-wire system according to claim 1, wherein determining the vehicle speed of the vehicle comprises determining the vehicle speed based on both a vehicle speed signal from a vehicle speed calculation module of the vehicle and the wheel speed indicated by the wheel speed sensor of the second wheel.

8. The brake-by-wire system according to claim 1, wherein the brake controller is further configured to stop outputting the second control signal to a brake unit of the wheel corresponding to the second axle in response to invalidity of a wheel speed sensor of at least one wheel other than the first wheel.

9. A vehicle, comprising a first axle and a second axle, four wheels, a brake pedal, a vehicle control unit, and a brake-by-wire system, wherein the first axle and the second axle are separately configured to connect two front wheels and two rear wheels of the vehicle, the brake-by-wire system comprises a brake controller and four brake units, the four brake units are separately configured to output brake forces to the four wheels of the vehicle, the brake pedal and the vehicle control unit are configured to send a brake signal to the brake controller, and the brake controller is configured to:

output a first control signal in response to the brake signal and wheel speed signals of wheel speed sensors of the four wheels of the vehicle, wherein the first control signal is used to control the four brake units to output brake forces, and each wheel speed signal indicates a rotational speed of a corresponding wheel; and output a second control signal in response to invalidity of a wheel speed sensor of a first wheel on the first axle in a process of receiving the brake signal, wherein the second control signal is used to control two brake units corresponding to the second axle to output brake forces, and to control two brake units corresponding to the first axle to stop outputting brake forces, wherein outputting the second control signal comprises determining a vehicle speed of the vehicle based on a wheel speed indicated by a wheel speed sensor of a second wheel on the first axle, determining a slip ratio of a wheel corresponding to the second axle based on the vehicle speed and a wheel speed of the wheel corresponding to the second axle, and controlling a brake force for the wheel corresponding to the second axle based on the slip ratio.

10. The vehicle according to claim 9, wherein the brake controller is further configured to:

output a third control signal in response to invalidity of wheel speed sensors of at least two wheels in the process of receiving the brake signal, wherein the third control signal is used to control the four brake units to output brake forces, and wherein slip ratios of the four wheels indicated by the third control signal do not change with wheel speeds indicated by the wheel speed sensors of the four wheels.

11. The vehicle according to claim 9, wherein the brake controller is further configured to:

output a fourth control signal in response to the brake signal and the wheel speed signals of the wheel speed sensors of the four wheels of the vehicle when the wheel speed sensor of the first wheel on the first axle is restored to be valid.

12. The vehicle according to claim 11, wherein the fourth control signal indicates that a brake force output by a brake unit of a wheel on the second axle first changes from a first value to at least one second value and then to a third value, wherein the first value is a value of a brake force indicated based on the first control signal, the third value is a value of a brake force determined based on a vehicle speed signal, and the at least one second value is between the first value and the third value.

13. The vehicle according to claim 11, wherein the fourth control signal indicates that a brake force output by a brake unit of a wheel on the first axle first changes from 0 to at least one fourth value, and then to a fifth value, wherein the fifth value is a value of the brake force determined based on a vehicle speed signal, and the at least one fourth value is between 0 and the fifth value.

14. The vehicle according to claim 9, wherein the brake controller is configured to receive the wheel speed indicated by the wheel speed sensor of the second wheel after brake forces for the first wheel and the second wheel on the first axle have been changed to 0.

15. The vehicle according to claim 9, wherein the vehicle further comprises a vehicle speed calculation module, and wherein determining the vehicle speed of the vehicle comprises determining the vehicle speed based on both a vehicle speed signal from the vehicle speed calculation module and the wheel speed indicated by the wheel speed sensor of the second wheel.

16. The vehicle according to claim 9, wherein the brake controller is further configured to stop outputting the second control signal to a brake unit of the wheel corresponding to the second axle in response to invalidity of a wheel speed sensor of at least one wheel other than the first wheel.

17. A control method for a brake-by-wire system for a vehicle, wherein the vehicle comprises a first axle and a second axle, the first axle and the second axle are separately configured to connect two front wheels and two rear wheels of the vehicle, the brake-by-wire system comprises a brake controller and four brake units, the four brake units are separately configured to output brake forces to the four wheels of the vehicle, and in a braking process of the vehicle, the method comprises:

outputting a first control signal in response to a brake signal and wheel speed signals of wheel speed sensors of the four wheels of the vehicle, wherein the first control signal is used to control the four brake units to output brake forces, and each wheel speed signal indicates a rotational speed of a corresponding wheel; and outputting a second control signal in response to invalidity of a wheel speed sensor of a first wheel on the first axle in a process of receiving the brake signal, wherein the second control signal is used to control two brake units corresponding to the second axle to output brake forces, and to control two brake units corresponding to the first axle to stop outputting brake forces, wherein outputting the second control signal comprises determining a vehicle speed of the vehicle based on a wheel speed indicated by a wheel speed sensor of a second wheel on the first axle, determining a slip ratio of a wheel corresponding to the second axle based on the vehicle speed and a wheel speed of the wheel corresponding to the second axle, and controlling a brake force for the wheel corresponding to the second axle based on the slip ratio.

18. The control method according to claim 17, wherein the control method further comprises:

outputting a fourth control signal, in the process of receiving the brake signal, in response to the wheel speed sensor of the first wheel on the first axle being restored to be valid, wherein the fourth control signal indicates that a brake force output by a brake unit of a wheel on the second axle first changes from a first value to at least one second value and then to a third value, wherein the first value is a value of a brake force indicated based on the first control signal, the third value is a value of a brake force determined based on a vehicle speed signal, and the at least one second value is between the first value and the third value.

19. The control method according to claim 17, wherein the control method further comprises receiving the wheel speed indicated by the wheel speed sensor of the second wheel after brake forces for the first wheel and the second wheel on the first axle have been changed to 0.

20. The control method according to claim 17, wherein determining the vehicle speed of the vehicle comprises determining the vehicle speed based on both a vehicle speed signal from a vehicle speed calculation module of the vehicle and the wheel speed indicated by the wheel speed sensor of the second wheel.

* * * * *